Aug. 9, 1966  C. B. WILLIS, JR., ET AL  3,265,442
DISTRIBUTOR FOR PULVERIZED MATERIAL
Filed Jan. 18, 1965

INVENTORS
CULLIE B. WILLIS, JR.
FREDERICK J. CEELY
BY John Maier, III
ATTORNEY

United States Patent Office 3,265,442
Patented August 9, 1966

3,265,442
DISTRIBUTOR FOR PULVERIZED MATERIAL
Cullie B. Willis, Jr., Westfield, N.J., and Frederick J. Ceely, College Point, N.Y., assignors to Foster Wheeler Corporation, New York, N.Y., a corporation of New York
Filed Jan. 18, 1965, Ser. No. 426,085
2 Claims. (Cl. 302—28)

This invention relates to the distribution of pulverized material, and more particularly to apparatus for the equal distribution of pulverized material into multiple transport pipes.

In the past, distributing devices have attempted to divide solid pulverized particles into several equal quantities by adjustable deflectors, grids, rods, angles, riffles, and forms of internal fixtures. Such devices when once adjusted frequently proved to be favorable only for a single rate of flow. Poor distribution resulted with every change in flow rate made to the distributor. Very often poor distribution existed regardless of any adjustments that might be made at any rate of flow.

Therefore, it is an object of this invention to provide an apparatus for the equal distribution of pulverized material.

Another object is to provide an apparatus for the equal distribution of pulverized material which does not require adaptation for change in the rate of flow of the pulverized material.

In accordance with this invention, equal distribution of the quantity of pulverized material being continuously fed into multiple transport pipes is accomplished by applying the principles of centrifugal separation of carrier air and pulverized solid particles within a distributing container. Bars located on the inner wall of the container break up and spread the mass of solid particles into a broad band which finally exits from the outlet of the container. In this way the material achieves a uniform peripheral distribution. With a uniform peripheral distribution of the pulverized material, the transport pipes connected to the outlet of the container each receive an equal amount of pulverized material.

Use of a distributing container in the form of the frustrum of a right circular cone with bars located in the inner surface has been used as a part of a pulverized fuel burner. An example of a burner containing such a container can be found in U.S. Patent No. 2,912,942 issued November 17, 1959 to G. G. Whitney, Jr. et al. and assigned to Foster Wheeler Corporation. This invention however, is directed toward a device for dividing solid pulverized particles into several equal quantities.

Figure 1:
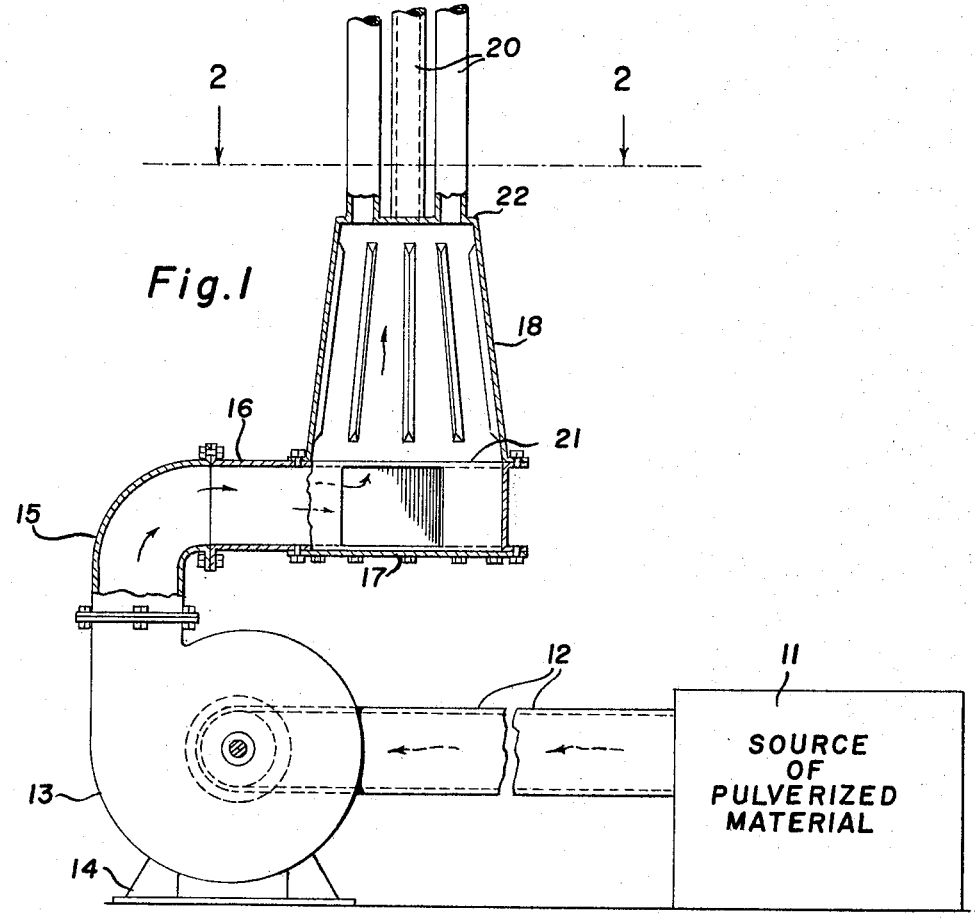
Figure 2:
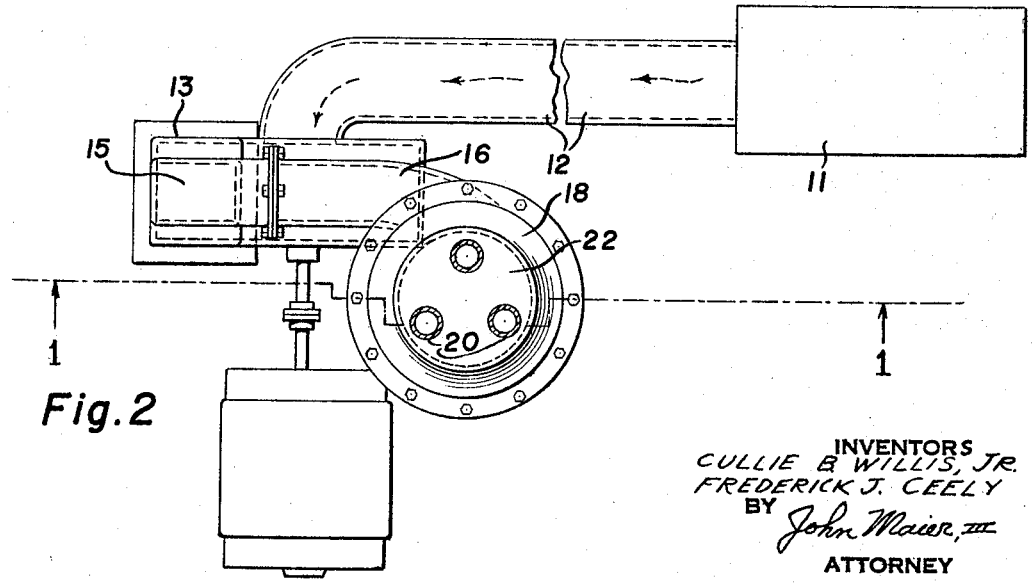

The invention may be better understood from the following detailed description considered in conjunction with the accompanying drawings in which:

FIGURE 1 is a side plan view of the invention.
FIGURE 2 is a top plan view of the invention.

Referring now to the drawings, pulverized material is received from a source 11 and is forced through an inlet supply duct 12 by a pulverized material blower 13. The pulverized material blower 13 forces the pulverized material in a stream mixed with air through a connecting elbow 15 and a connecting duct 16 into a device 17 which imparts a circular motion to the stream and which is preferably a volute. The volute 17 is connected to an inlet 21 of a container 18 shaped in the form of a frustrum of a right circular cone. Due to circular motion, the stream of pulverized material enters the container 18 along a helical path. Bars 19 preferably triangular are located longitudinally on the inner wall of the distributor 18 to convert the tangential motion of the stream to a direction longitudinal with the container 18. At outlet 22 of the container 18 are located equally spaced pipes 20 as best seen in FIGURE 2. The pipes 20 serve to transport the pulverized material to whatever application is intended as for example the burners in a steam generator if coal is the pulverized material. Since the container 18 is symmetrical and the pipes 20 are located about the axis of symmetry of the container 18, equal passage of pulverized material flows into each transport pipe 20.

Despite the illustration of this invention with the blower 13 downstream of the source of pulverized material, it would also be operable in a system where the blower is located upstream of the pulverized. Likewise, this invention is applicable to any system regardless of the type of pressure medium employed.

This apparatus is intended for operation in the equal distribution of such pulverized materials as coal, coke breeze, and other burnable materials. However, it can be equally as well utilized for the distribution of other pulverized material such as cement, pigments, flour, and dry food products. With burnable material such as coal, the extent of pulverization is at least sufficient to pass seventy (70%) percent through a No. 200 mesh.

Although this invention has been described in its preferred form with a certain degree of particularity, it is understood that the present disclosure of the preferred form has been made only by way of example and that numerous changes in the details of construction and the combination and arrangements of parts may be resorted to without departing from the spirit and the scope of the invention as hereinafter claimed.

What is claimed is:

1. An apparatus for equally distributing to multiple pipes a moving stream of pulverized material, comprising:
    a volute for imparting a circular motion to a moving stream of pulverized material,
    a container in the form of a frustrum of a right circular cone having an inlet, an outlet, and an inside wall surface, said container being connected at said inlet to said volute to receive said circularly moving stream of pulverized material through said inlet so that said stream of pulverized material will pass into said container with a helical motion,
    bars attached longitudinally to the inside of said container to transform said helical motion to a motion longitudinal with said container so that said pulverized material moves axially to said outlet in a broad band, and
    multiple pipes equally spaced about said outlet whereby an equal quantity of said pulverized material enters each pipe.

2. An apparatus according to claim 1 wherein said bars are of triangular shape.

References Cited by the Examiner

UNITED STATES PATENTS

| | | | |
|---|---|---|---|
| 1,823,932 | 9/1931 | Dyer | 302—28 |
| 2,400,703 | 5/1946 | Messinger | 302—28 |
| 2,912,942 | 11/1959 | Whitney et al. | |
| 3,050,341 | 8/1962 | Whitney | 302—28 |

EVON C. BLUNK, *Primary Examiner.*
ANDRES H. NIELSEN, *Examiner.*